July 11, 1939.　　　O. J. BROCK　　　2,165,335
STONE SAWING MACHINE
Filed Feb. 1, 1939　　6 Sheets-Sheet 1

INVENTOR
Ottie J. Brock.
BY Corbett + Mahoney
ATTORNEYS

July 11, 1939.  O. J. BROCK  2,165,335
STONE SAWING MACHINE
Filed Feb. 1, 1939  6 Sheets-Sheet 5

INVENTOR
Ottie J. Brock.
BY Corbett + Mahoney
ATTORNEYS

July 11, 1939.　　　O. J. BROCK　　　2,165,335
STONE SAWING MACHINE
Filed Feb. 1, 1939　　　6 Sheets-Sheet 6

INVENTOR
Ottie J. Brock.
BY Corbett + Mahoney
ATTORNEYS

Patented July 11, 1939

2,165,335

UNITED STATES PATENT OFFICE 2,165,335

STONE SAWING MACHINE

Ottie J. Brock, Vincennes, Ind.

Application February 1, 1939, Serial No. 254,077

11 Claims. (Cl. 125—16)

My invention relates to a stone sawing machine. It has to do, more particularly, with a stone sawing machine of the reciprocating cutter bar type wherein shot or other abrasive is employed with the cutter bar in order to produce the cutting action. My machine is particularly suitable for sawing granite or other hard stone but can be employed for sawing other types of stone.

In the past, many different types of stone sawing machines have been used. All of these prior art machines are possessed of certain undesirable features. These prior art machines are usually not of a very sturdy construction and will not sustain the excessive shocks to which they are subjected during the sawing of the stone, particularly hard stone. Furthermore, the prior art machines are usually of such a type that they will not produce a straight, even cut in the stone. With such machines it is usually necessary to cut a groove in the stone by some other means when starting to make a channel by a machine in order to start the channel straight. Another difficulty encountered when using prior art machines is that of keeping the shot or abrasive in proper association with the cutter bar. Another disadvantage of these prior art machines resides in the fact that they are not provided with positive and effective means for feeding the cutter bars into the stone with the proper pressure. These prior art machines of the general type indicated have not been suitable for use in sawing stone from a natural quarry bed.

One of the objects of my invention is to provide a machine for sawing stone which is very effective and which is of a very sturdy construction so that it will withstand the heavy shocks to which it is subjected.

Another object of my invention is to provide a machine for sawing stone which is of such a nature that the cut may be initiated by the machine without first cutting grooves in the stone by other means.

Another object of my invention is to provide a machine for sawing stone which is of such a nature that it will produce a straight, even cut in the stone.

Another object of my invention is to provide a machine of the type indicated for sawing or cutting stone which is of such construction that the shot or abrasive used in the cutting operation will always be in proper association with the cutter bar.

Another object of my invention is to provide a machine of the type indicated for sawing or cutting stone which has means incorporated therein for feeding the cutter bar into the stone positively and effectively and with the proper pressure regardless of the hardness of the stone.

Another object of my invention is to provide a stone-cutting machine which is of such a nature that it may be employed for cutting stones directly from a natural quarry bed.

Various other objects will be apparent from the following description.

In its preferred form my invention contemplates the provision of a stone sawing machine which embodies a plurality of vertically disposed cutter bars. These cutter bars are suspended from an upper carriage which is mounted on a suitable supporting structure for longitudinal reciprocation. The lower ends of the cutter bars pass through a second carriage which may be termed a guide carriage and which is also mounted on the frame of the machine for longitudinal reciprocation. Means is provided for reciprocating both the upper and the lower carriage longitudinally at the same time in order to move the lower ends of the cutter bars back and forth through the stone. As the cutter bars cut into the stone, means is provided for lowering the upper carriage to feed the cutter bars into the stone with the proper pressure. When the upper carriage is lowered, the cutter bars feed downwardly through the lower carriage in which they are mounted for vertical sliding movement. The lower carriage will always be closely adjacent the top surface of the stone being cut and will serve as a guide member to prevent lateral movement of the cutter bars. Consequently, the channel produced in the stone by the cutter bars will be very straight and even.

The preferred embodiment of my invention is illustrated in the accompanying drawings wherein similar characters of reference designate corresponding parts and wherein.

Figures 1, 2:
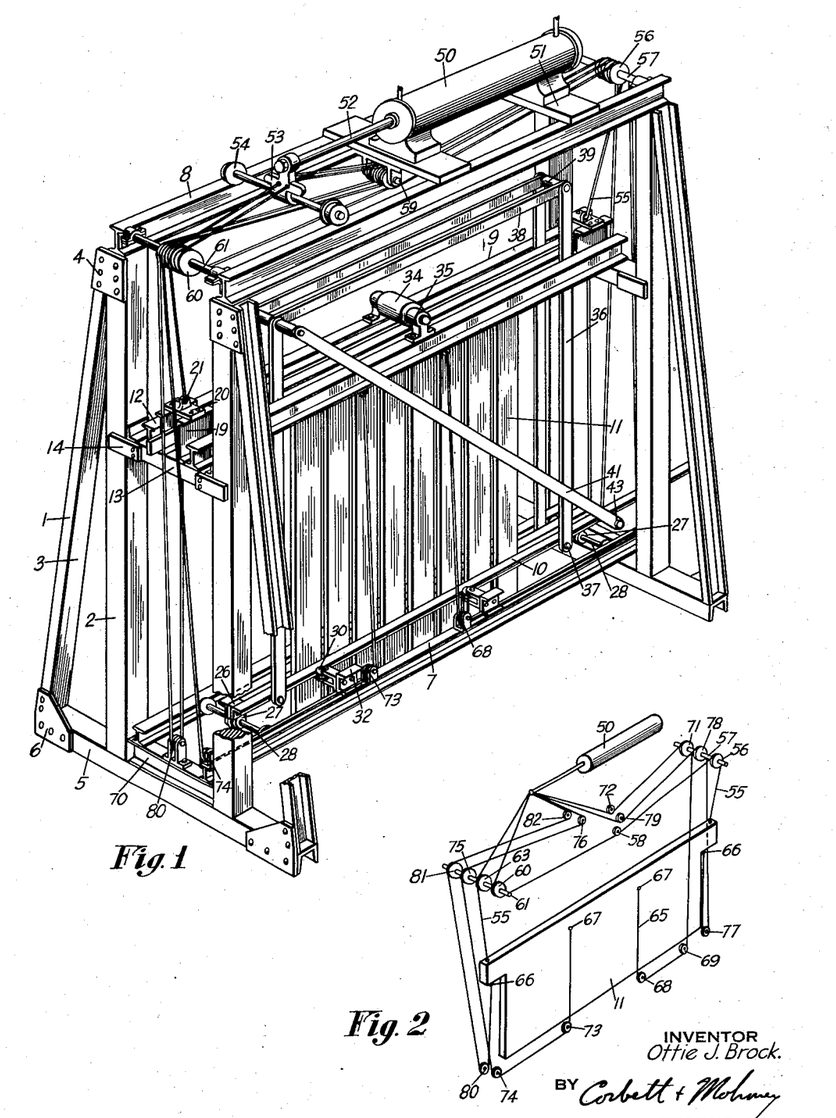
Figure 1 is a perspective view of a stone cutting machine constructed in accordance with the principles of my invention.
Figure 2 is a diagrammatic view illustrating hydraulic means which I may provide for feeding the cutter bars into the stone with the proper pressure.
Figure 3:
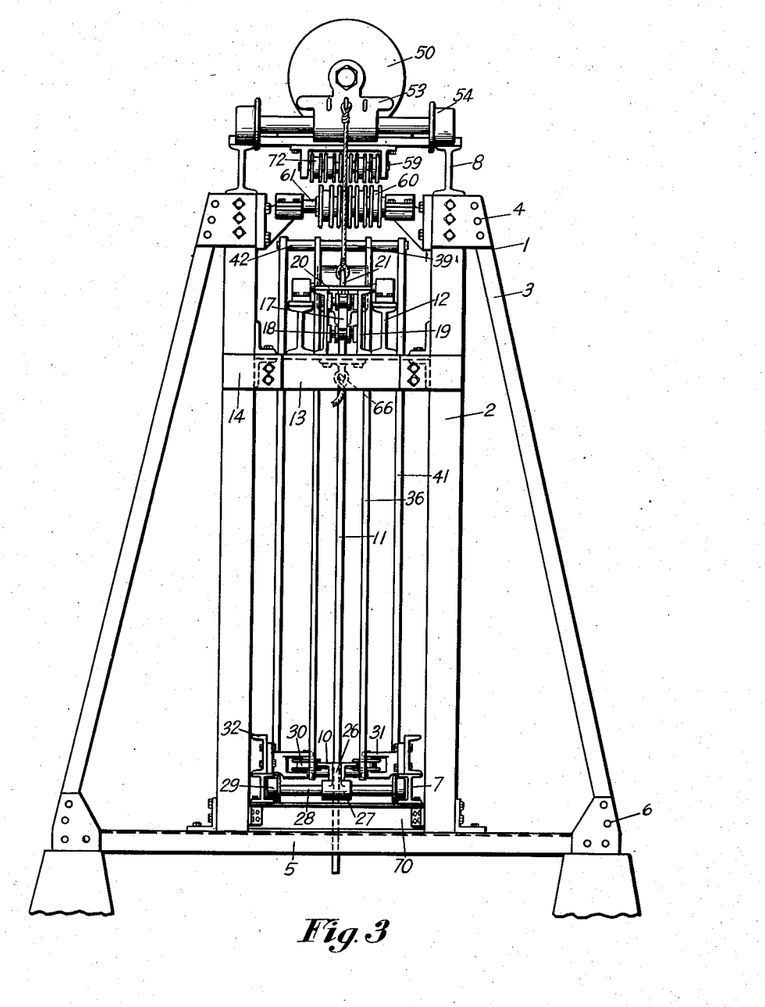
Figure 3 is an end view of the machine illustrated in Figure 1.
Figure 4:
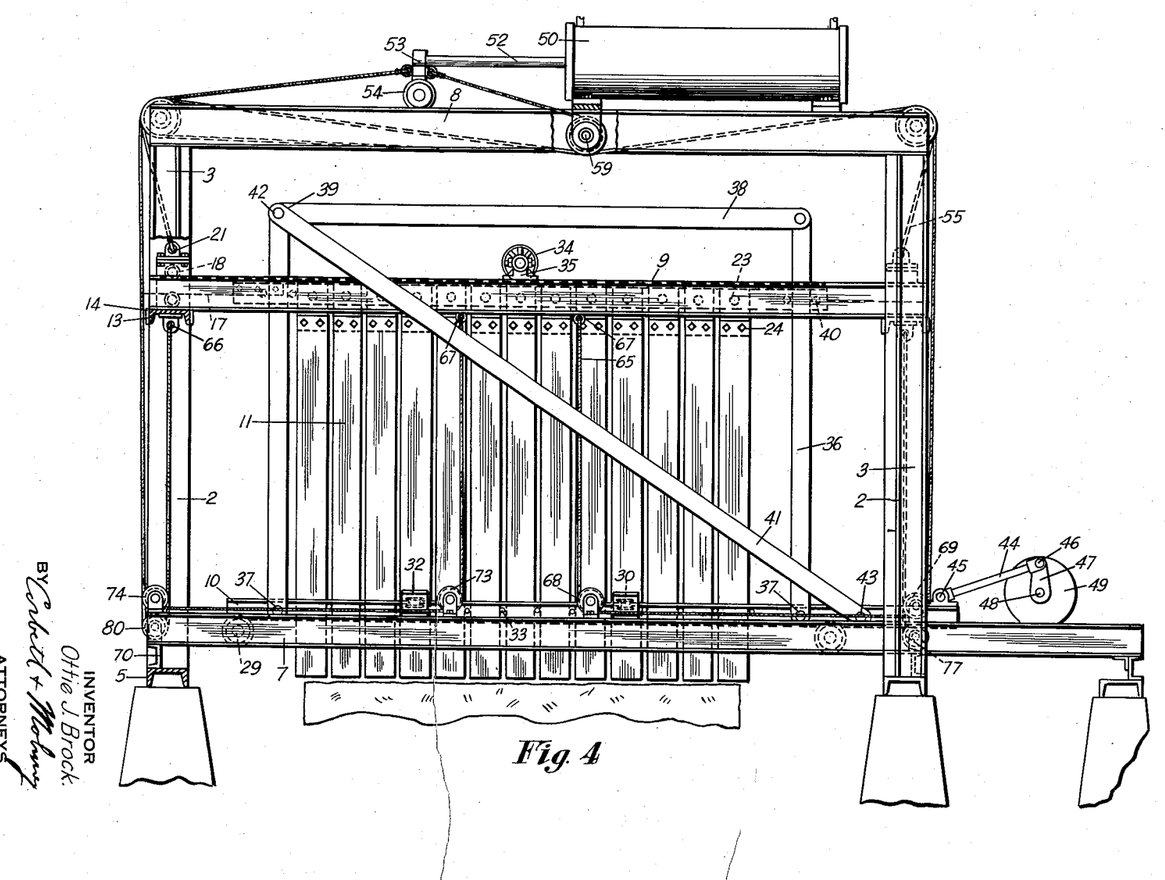
Figure 4 is a side elevation, partly broken away, of the machine illustrated in Figure 1.

With reference to the drawings and particularly to Figures 1, 3 and 4, I have illustrated my machine as comprising a main frame 1. This main frame comprises end sections which consists of a pair of spaces vertically disposed columns 2 which form guides for the carriages of my machine. Inwardly inclined beams 3, which serve as braces, are rigidly riveted to the upper ends of the columns 2, as at 4, and have their lower ends rigidly secured to a sill 5, as at 6. The columns 2 also have their lower ends secured to the sill 5. The end members of the frame are joined tobether by a pair of longitudinal extending lower I-beams 7 which are connected to the columns and to the sill and which rest on transverse members 70 secured to the sill. The end members of the frame are similarly joined at their upper ends by means of a pair of longitudinally extending I-beams 8 which are secured to the upper ends of the columns. Thus, a rigid frame structure is provided.

My machine also includes an upper carriage which is supported on a frame indicated generally by the numeral 9 and a lower carriage which may be indicated generally by the numeral 10. The upper carriage is adapted to carry a plurality of vertically disposed longitudinally spaced cutter bars 11. These cutter bars also extend through the lower carriage 10 which serves as a guide therefore, as will later appear.

The carriage support 9 consists of a pair of longitudinally extending I-beams 12. These I-beams 12 are secured at each end to a transverse member 13. This member 13 is disposed between the columns 2 and its ends will contact therewith to guide vertical movement of the carriage. The outer surface of the member 13 has welded thereto at each end thereof a bar 14. Each of these bars cooperates with the outer surface of the adjacent column 2 to prevent longitudinal movement of the carriage support 9 relative to the frame of the machine. The carriage support 9 may be moved vertically in a manner which will be described later. During vertical movement it will be guided by cooperation of the member 13 and associated parts with the columns 2.

Figure 5:
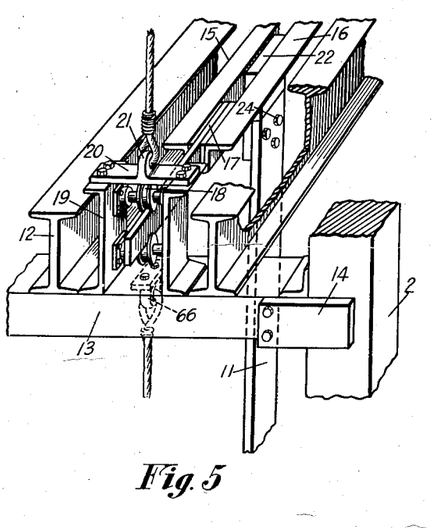
Figure 5 is a detail in perspective, partly broken away, showing a portion of the upper carriage and how it is mounted on the frame of the machine and also showing how the upper ends of the cutter bars are secured to the upper carriage.

The beams 12 and members 13 serve as a supporting structure for the upper carriage 15 from which the cutter bars 11 are suspended. This carriage 15 is mounted on the said supporting structure in such a manner that it may be reciprocated longitudinally thereon. The carriage 15 consists of a pair of longitudinally extending angle members 16 (Figure 5). The angle members have clamped between the ends thereof an outwardly extending guide bar 17. This guide bar 17 extends between a pair of vertically spaced grooved rollers 18. These rollers 18 are carried on supports 19 which are secured to the top surface of the member 13. The upper ends of members 19 are joined together by a bar 20 which has an eye 21 formed thereon by means of which the carriage support 9 may be suspended from the main frame.

Thus, the members 16 are supported in spaced relationship. At regular longitudinally spaced intervals, blocks 22 are disposed between the members 16. These blocks 22 are preferably pivoted to the members 16 by a suitable lubricated pivot construction 23. Each block 22 is reduced in thickness at its lower end and has bolted thereto, as at 24, the upper end of a cutter bar 11. Thus, these cutter bars may be readily removed and replaced. It will be noted from Figure 4, that the cutter bars 11 are perpendicularly disposed. They are spaced slightly from each other. They are all suspended from the carriage 15 which is longitudinally reciprocable. As previously stated, the cutter bars 11 extend downwardly through the lower carriage 10.

Figure 6:
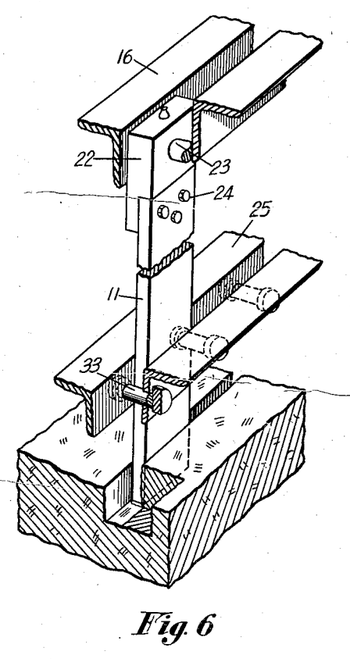
Figure 6 is a detail in perspective illustrating how the cutter bar is secured to the upper carriage and is connected to the lower carriage and also illustrating how the bar produces a cut in the stone.

The lower carriage 10 (Figures 1, 3 and 6) comprises a pair of longitudinally extending angle irons 25 similar to the angle irons 16 of the upper carriage. These members are supported in spaced relationship to permit the cutter bars 11 to pass freely therethrough. The ends are secured to a member 26 that extends upwardly therebetween. This member 26 has a sleeve 27 on its lower end through which a transversely extending axle 28 passes. This axle carries at its ends flanged rollers 29 which operate between the flanges of the I-beams 7 and thereby permit horizontal movement but prevent vertical movement of the lower carriage. Thus, the lower carriage 10 is supported in such a manner that it may be reciprocated longitudinally of the machine. In order to aid in preventing lateral movement of the carriage 10, a pair of guide rollers 30 is provided adjacent each end thereof. Each roller is supported on a bifurcated bracket 31 which is secured to a bracket 32 that is fastened to an I-beam 7. Each roller is grooved and cooperates with the horizontal flange of the angle iron 25. In order to keep the lower ends of the cutter bars 11 in spaced relationship, suitable bolt structures 33 are provided adjacent each edge of each cutter bar. These bolt structures pass through openings provided in the members 25. It will be apparent that when the upper carriage support 9 is moved vertically, the cutter bars 11 will slide through the carriage 10. The carriage 10 serves as guiding means for the cutter bars. In order to prevent upward thrusts which are exerted on the lower ends of the cutter bars in sawing stone from bending the carriage 15 upwardly to an undersirable extent, a roller 34 is provided. This roller is rotatably carried by brackets 35 which are secured to the upper surfaces of the I-beams 12. If the members 16 bend upwardly a predetermined extent, they will contact with this roller and further bending will be precluded.

I provide suitable structure for connecting the carriages 10 and 15 together so that they will be reciprocated simultaneously. This structure comprises a pair of vertically disposed bars 36 disposed at each end of the carriages. The lower ends of the bars 36 are bolted together by a pivot bolt structure 37 which also passes through the members 25 of the lower carriage 10. The upper ends are joined together and to a pair of horizontally extending bars 38 by a similar bolt structure 39. The bars 36 pass betwen guides 40 which are secured to the upper carriage 15. In order to maintain the frame structure formed by members 36 and 38 rigid, diagonally extending bars 41 are provided. These bars 41 have their upper ends secured at 42 to one of the pivot bolt structures 39. Their lower ends are rigidly secored at 43 to the members 25. To reciprocate the carriages 10 and 15, a pitman 44 may be pivotally connected as at 45 to the members 25 of the lower carriage (Figure 4). The opposite end of the pitman is pivotally connected as at 46 to the outer end of a crank arm 47 which is keyed on a shaft 48 which may be rotated by an electric motor illustrated diagrammatically at 49. The push and pull exerted by the pitman 44 on the lower carriage 10 will be transmitted by the rods 36 and 41 to the upper carriage 15 and will cause it to be reciprocated simultaneously. Vertical movement of the upper carriage will not interfere with this since the rods 36 will merely slide through the guide members 40.

When this machine is used for cutting stone, the stone will be placed beneath the I-beam 7 (Figure 4). The carriage support 9 will be lowered until the lower ends of the cutter bars 11 contact with the top surface of the stone. Then reciprocation of the carriages 10 and 15 is started so that the lower ends of the blades will be moved back and forth relative to the stone producing a cut therein. As the cutter bars produce the cut, they are fed into the stone. This is done by lowering the carriage support 9. This, in turn, causes the blades 11 to slide downwardly through the lower carriage 10. This carriage 10 will always be close to the top surface of the stone and will serve to guide the blades, preventing lateral movement or bending thereof. Consequently, the channel produced in the stone will be straight and even.

In order to lower the carriage support 9 and feed the blades 11 into the cut in the stone at the proper rate and so that the blades will contact with the stone with the proper pressure, I preferably provide a hydraulic structure of the type illustrated in Figures 1 to 4, inclusive. This structure comprises a hydraulic cylinder 50 which may be connected to any suitable source of hydraulic fluid. Any suitable valve may be provided for controlling the flow of fluid to and from cylinder 50. The cylinder 50 is carried by supports 51 resting on the top I-beams 8. A piston rod 52 extends from the cylinder 50. It is connected to a carriage 53 which is supported on flange rollers 54 which operate on the I-beams 8.

The carriage support 9 is suspended from the main frame by a pair of cables 55. Each of these cables is connected to the eye member 21 of the support 9. One of these cables passes upwardly over a pulley 56 supported on a transverse shaft 57 carried by the frame of the machine and then horizontally beneath an idler pulley 58 carried by a shaft mounted on bracket 59 secured to one of the members 51. This cable then passes around pulley 60 mounted on shaft 61 secured to the opposite end of the frame. It then passes in the opposite direction and is anchored to the carriage 53. The other cable 55 merely passes upwardly around a pulley 63 on shaft 61 and then horizontally and is anchored to the carriage 53. These two cables would be sufficient to lower and raise the carriage support 9.

However, in order to exert a downward pull on the carriage support 9 so that the cutter bars will contact with the stone with a positive pressure, I provide four additional cables 65. Two of these cables are connected to the carriage support 9 adjacent its ends, as at 66, and two are connected to the carriage support intermediate its ends, as at 67. One of the cables 65 which is connected to the carriage support as at 67 passes downwardly and horizontally about pulleys 68 and 69, supported on the beam 7 and transverse member 70, then upwardly and horizontally around a pulley 71 on shaft 57, beneath a pulley 72 supported by bracket 59, and is then anchored to the carriage 53. The other cable which is connected to the carriage at 67 passes downwardly and horizontally around pulleys 73 and 74 that are supported on members 7 and 70, then upwardly and horizontally around pulley 75 on shaft 61, then around pulley 76 carried by bracket 59 and is then anchored to carriage 53. The cable 65 which is connected at 66 to one end of the carriage support 9 passes downwardly around a pulley 77, carried by member 70, upwardly and horizontally around pulley 78 mounted on shaft 57, horizontally beneath pulley 79, carried by bracket 59, and is anchored to the carriage 53. The cable 65, connected to the opposite end of the carriage support 9 at 66, passes downwardly and then upwardly around pulley 80, supported by member 70, then around pulley 81, carried by shaft 61, then horizontally beneath pulley 82, carried by bracket 59, and then in a reverse direction and is connected to the carriage 53.

It will be noted that the cables 55 are so arranged and the cables 65 are so arranged and are all connected to the carriage 53 in such a manner that when the piston rod 52 moves outwardly, a downward pull will be exerted by the cables 65 on the carriage support 9 and, at the same time, the cables 55 will be paid out so that they will not resist this downward pull. When the piston rod is moved inwardly into cylinder 50, the cables 55 will exert an upward pull on the carriage support, raising it, the cables 65 simultaneously being paid out, permitting this upward movement.

It will be apparent that with this hydraulic feed structure, high feed pressure may be applied to the cutter bars without employing a heavy carriage support. By setting the hydraulic feed at a predetermined pressure, the saw can be operated at its maximum capacity at all times. The speed of the sawing will be in inverse proportion to the resistance offered by the stone, whether a long channel or a short channel is being made or whether the cutter bars are working in hard or soft stone.

Figure 10:
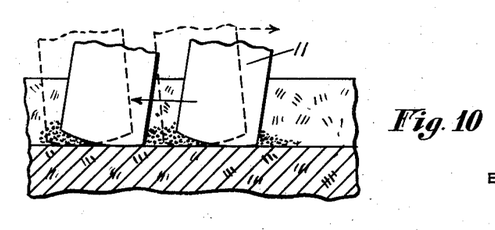
Figure 10 is a diagrammatic view illustrating how the cutting bars of the machine shown in Figure 8 will be tilted or rocked during reciprocation of the carriages.

In using this machine, when a cut is started into the stone, shot or other suitable abrasive is placed on the stone in the path of the cutter bars 11. This abrasive facilitates the cutting action. Due to the fact that the lower ends of the cutter bars are in spaced relationship, the shot will be maintained in association with the lower ends of these bars. However, in some instances, it may be desirable to tilt or rock the cutter blades so that their forward or leading edges will be higher than the rear or trailing edges, as illustrated in Figure 10. This will serve to maintain the shot or abrasive ahead of the cutter bars, as illustrated in this figure.

Figures 8, 9, 11:
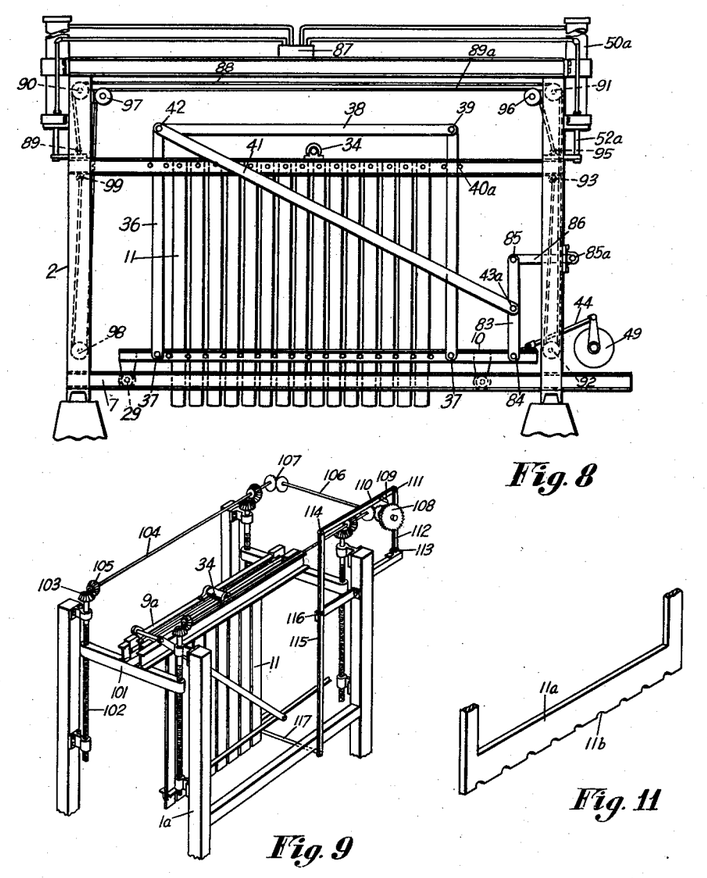
Figure 8 is a side elevation of a machine very similar to that shown in Figure 1 but which is provided with different feeding means and with means for tilting the cutter bars during the reciprocation of the carriages.
Figure 9 is a perspective view illustrating mechanical means for feeding the cutter bars into the stone.
Figure 11 is a perspective view of a single cutter bar which may be used on my machine.

To accomplish this, it is merely necessary to change the machine slightly, as illustrated in Figure 8. Instead of anchoring the lower ends of the members 41 to the members 25 of the lower carriage, they are pivoted at 43a to vertically disposed rods 83. These rods 83 are pivoted at their lower ends, as at 84, to the members 25 of the lower carriage. They are pivoted at their upper ends, as at 85 to links 86 which are pivoted to the main frame of the machine, as at 85a. The bars 36 pass between pins 40a which replace the guide members 40, carried by unit 15 and which are spaced apart sufficiently to permit rocking of these bars. The pitman 44 and associated parts are exactly as before.

With this structure, when the motor 49 is operated, the pitman 44 will move the lower carriage 10. This will cause the members 83 to swing about the pivot 85 and members 86 to swing downwardly about pivot 85a. This, in turn, will cause bars 41 to move the upper ends of bars 36. However, due to the fact that the bars 41 in this instance are connected to member 83 at pivot point 43a, spaced above pivot point 84, the lower carriage will be moved forwardly ahead of the upper carriage. This will cause all of the cutter bars to tilt around the pivot points 23. This, in turn, will cause the leading edges of the bars to be higher than the trailing edges, as illustrated in Figure 10, which will more effectively keep the shot or abrasive under the cutter bars. Thus, with this machine, I provide means for reciprocating the two carriages simultaneously but the lower carriage will travel in both directions a short distance ahead of the upper carriage, producing the tilting action. The two carriages travel simultaneously but the upper carriage travels slower. The location of pivot point 43a may be varied to vary the extent of the relative movement of these carriages.

In Figure 8, I also illustrate a different type of feeding means which may be employed, if desired. This feeding means may be hydraulically or air operated. It comprises a pair of vertically disposed cylinders 50a, the piston rods 52a of which are connected to opposite ends of the carriage support 9. A valve unit 87 may be provided for controlling flow of fluid to these cylinders. Thus, these cylinders will control raising and lowering of the support for the upper carriage and the pressure with which the cutter bars contact with the stone. In order to cause the cylinders 50a to operate simultaneously and apply the same pressure to the carriage support 9, I provide the cable arrangement also illustrated in this figure. One cable 88 is connected at 89 to the top of the carriage support 9. It passes upwardly around a pulley 90 carried by the frame, then horizontally to the other end of the machine, downwardly around a pulley 91 supported by the frame, around a lower pulley 92 supported by the frame and then upwardly where it is anchored to the carriage support 9, as at 93. The other cable 89a is connected at 95 to the top of carriage support 9 and passes upwardly around a pulley 96 supported by the frame, then horizontally and downwardly around a pulley 97 supported by the frame at the opposite end of the machine, then downwardly and upwardly around a pulley 98, supported by the frame, and its end is anchored to the lower side of the carriage support 9, as at 99. These two cables insure that equal pressure is applied to the opposite ends of the carriage support 9 and insure that even pressure will be applied to the stone throughout its length.

In Figure 9, I illustrate a mechanical feed for feeding the cutter bars into the stone. In this instance a main frame 1a of suitable form may be provided. This frame carries a support 9a for the upper carriage unit. This carriage support 9a may be carried by transverse members 101. Vertical screws 102 are threaded through these members and are rotatably supported by the main frame. Each screw 102 has a bevel gear 103 on its upper end. Longitudinally extending shafts 104 are provided and carry bevel gears 105 which mesh with the bevel gears 103. Each shaft 104 is driven by a transverse shaft 106 and a set of bevel gears 107. The shaft 106 carries on its outer end a large ratchet gear 108. A pawl member 109 is pivoted to a horizontal bar 110 and engages the gear 108. Member 110 has one end pivoted at 111 to the upper end of a bar 112, which has its lower end pivoted at 113 to a support secured to the main frame. The opposite end of bar 110 is pivoted at 114 to the upper end of a bar 115. This bar is pivoted adjacent its upper end, as at 116, to a support secured to the main frame. A rigid connection 117 is provided for connecting the extreme lower end of this bar to the lower carriage 10.

When the lower carriage 10 is reciprocated, the bar 115 will be pivoted around the pivot 116. This will reciprocate the bar 110. In one direction of its movement, the bar 110 will cause the pawl 109 to engage ratchet gear 108 and rotate it one step. This will cause slight rotation of shaft 106 and, consequently, of each screw 102. This, in turn, will cause the cutter bars to feed downwardly since the carriage support 9a will be moved downwardly to a slight degree. Thus, as the carriages reciprocate, the cutter bars will be gradually fed into the cut in the stone.

In Figure 11, I have illustrated a single blade 11a which may be used in place of the cutter bars 11 and will be carried by the upper carriage. This blade has in its lower edge a number of notches 11b so as to form separate cutter portions.

Figure 12:
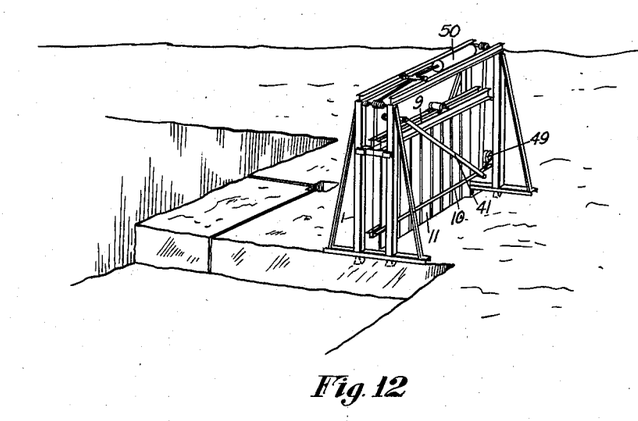
Figure 12 is a perspective view illustrating how my machine may be employed for sawing stone from a natural quarry bed.

My machine may be used for cutting sections of stone which are placed beneath it as indicated in Figure 4. However, it may also be used for cutting stone directly from a quarry bed, as illustrated in Figure 12. To do this, the machine is anchored on the top surface of the rock from which sections are to be cut. It is not necessary to bore the quarry bed every few inches, as with prior art methods of removing stone from a bed. It is merely necessary to produce a small hole at each end of the saw to permit the proper reciprocation stroke. If one end of the stone is free, it is merely necessary to produce an opening at the opposite end for the saw, as illustrated in Figure 12.

Figure 13:
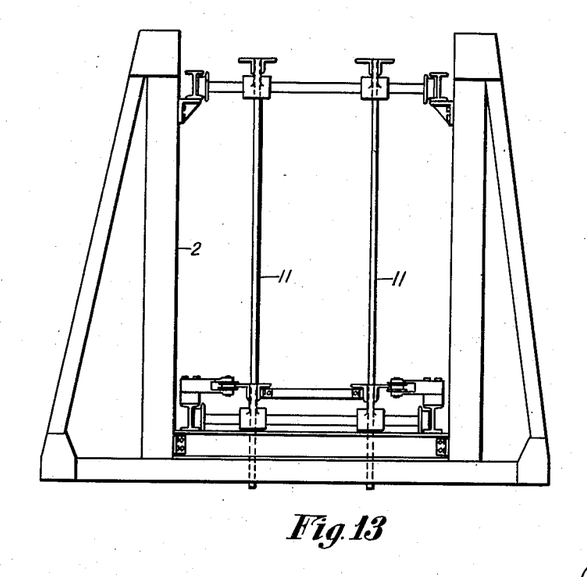
Figure 13 is an end elevation of a machine constructed according to my invention which will produce two spaced channels in the stone simultaneously.

Although in the machine described herein, I have indicated that there is a single row of cutter bars so that only a single channel will be produced thereby, it is possible to modify the machine so that any number of rows of cutter bars may be provided thereon. Thus, in Figure 13, I have illustrated two rows of cutter bars 11 provided on the machine. This machine will produce two channels in the stone.

Figure 7:
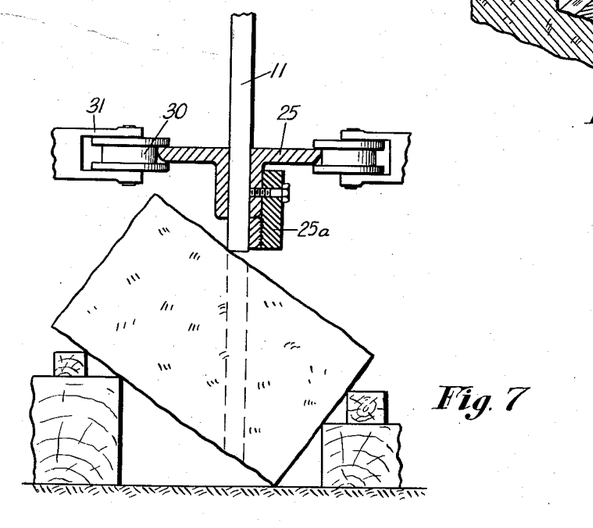
Figure 7 is a diagrammatic view illustrating how with my machine a cut may be produced in the stone at an angle to the top surface thereof.

It will be apparent from the above description that I have provided a machine having many advantages. The machine is very sturdy and is very effective. It is of such a nature that the cut into the stone may be initiated without first cutting grooves therein by other means. It will produce a straight, even cut in the stone. For example, as illustrated in Figure 7, it will produce a straight cut in the stone at an angle to the surface thereof. When performing an operation of the type indicated in Figure 7, it may be desirable to have an extra guide bar 25a bolted to one of the members 25 at the side toward which the lower end of the cutter bar will tend to be deflected.

The saw is of such a structure that the shot or abrasive will always be in proper association with the cutter bars. The machine has means incorporated therein for positively feeding the cutter bars into the stone with the proper pressure.

Various other advantages will be apparent from the preceding description, the drawings and the following claims.

Having thus described my invention, what I claim is:

1. A stone sawing machine comprising a frame, an upper carriage mounted on said frame in such a manner that it may be reciprocated, a lower carriage independently mounted on said frame in such a manner that it may be reciprocated, a cutter bar suspended from said upper carriage, said cutter bar extending downwardly through said lower carriage which serves as a guide therefor, and means for reciprocating both of said carriages.

2. A stone sawing machine comprising a frame, an upper carriage mounted on said frame in such a manner that it may be reciprocated, a lower carriage independently mounted on said frame in such a manner that it may be reciprocated, a cutter bar supported by said upper carriage, said cutter bar extending downwardly through said lower carriage which serves as a guide therefor, said upper carriage being vertically adjustable relative to said lower carriage to move said cutter bar up and down through said lower carriage, and means for reciprocating both of said carriages.

3. A stone sawing machine comprising a frame, an upper carriage mounted on said frame in such a manner that it may be reciprocated, a lower carriage independently mounted on said frame in such a manner that it may be reciprocated, a plurality of vertically disposed longitudinally spaced cutter bars suspended from said upper carriage, said cutter bars extending downwardly through said lower carriage which serves as a guide therefor, said upper carriage being vertically adjustable relative to said lower carriage to move said cutter bars up and down through said lower carriage, and means for reciprocating both of said carriage.

4. A stone sawing machine comprising a frame, an upper carriage mounted on said frame in such a manner that it may be reciprocated, a lower carriage independently mounted on said frame in such a manner that it may be reciprocated, a cutter bar supported by said upper carriage, said cutter bar extending downwardly through said lower carriage which service as a guide therefor said upper carriage being vertically adjustable relative to said lower carriage to move said cutter bar up and down through said lower carriage, means for reciprocating both of said carriages, and means for forcing said upper carriage downwardly to force the cutter bar into the stone.

5. A stone sawing machine comprising a frame, an upper carriage mounted on said frame in such a manner that it may be reciprocated, a lower carriage independently mounted on said frame in such a manner that it may be reciprocated, a cutter bar supported by said upper carriage, said cutter bar extending downwardly through said lower carriage which serves as a guide therefor, said upper carriage being vertically adjustable relative to said lower carriage to move said cutter bar up and down through said lower carriage, means for reciprocating both of said carriages, and hydraulic means for forcing said upper carriage downwardly to force the cutter bar into the stone.

6. A stone sawing machine comprising a frame, an upper carriage mounted on said frame in such a manner that it may be reciprocated, a lower carriage mounted on said frame in such a manner that it may be reciprocated, a cutter bar suspended from said upper carriage in such a manner that it may rock relative thereto, said cutter bar extending downwardly through said lower carriage which serves as a guide therefor, and means for reciprocating both of said carriages, said means causing said lower carriage to travel ahead of said upper carriage in order to rock said cutter bar so that its leading edge will be higher than its trailing edge.

7. A stone sawing machine comprising a frame, a carriage mounted on said frame in such a manner that it may be reciprocated, a cutter bar suspended from said carriage in such a manner that it may rock relative thereto, and means for reciprocating said carriage, said means including positive means for rocking said cutter bar during reciprocation of said carriage so that the leading edge of said cutter bar will be higher than its trailing edge.

8. A stone sawing machine comprising a frame, an upper carriage mounted on said frame in such a manner that it may be reciprocated, a lower carriage mounted on said frame in such a manner that it may be reciprocated, a plurality of vertically disposed longitudinally spaced cutter bars suspended from said upper carriage in such a manner that they may rock relative thereto and extending downwardly through said lower carriage which serves as a guide therefor, said upper carriage being vertically adjustable relative to said lower carriage to move said cutter bars up and down through said lower carriage, means for reciprocating both of said carriages, said means including means for causing said lower carriage to travel ahead of said upper carriage in such a manner that said cutter bars will be rocked during travel of the carriages so that the leading edges of the cutter bars will be higher than the trailing edges of the cutter bars.

9. A stone sawing machine comprising a frame, an upper carriage mounted on said frame in such a manner that it may be reciprocated, a lower carriage mounted on said frame in such a manner that it may be reciprocated, a cutter bar suspended from said upper carriage in such a manner that it may rock relative thereto, said outer bar extending downwardly through said lower carriage which serves as a guide therefor, said upper carriage being vertically adjustable relative to said lower carriage to move said cutter bar up and down through said lower carriage, means for reciprocating both of said carriages, said means causing said lower carriage to travel ahead of said upper carriage in order to rock said cutter bar so that its leading edge will be higher than its trailing edge, and means for forcing said upper carriage downwardly to force the cutter bar into the stone.

10. A stone sawing machine comprising a frame, an upper carriage mounted on said frame in such a manner that it may be reciprocated, a lower carriage mounted on said frame in such a manner that it may be reciprocated, a cutter bar suspended from said upper carriage in such a manner that it may rock relative thereto, said cutter bar extending downwardly through said lower carriage which serves as a guide therefor, said upper carriage being vertically adjustable relative to said lower carriage to move said cutter bar up and down through said lower carriage, means for reciprocating both of said carriages, said means causing said lower carriage to travel ahead of said upper carriage in order to rock said cutter bar so that its leading edge will be higher than its trailing edge, and hydraulic means for forcing said upper carriage downwardly to force the cutter bar into the stone.

11. A stone sawing machine comprising a frame, an upper carriage mounted on said frame in such a manner that it may be reciprocated, a lower carriage independently mounted on said frame in such a manner that it may be reciprocated, a cutter bar supported by said upper carriage, said cutter bar extending downwardly through said lower carriage which serves as a guide therefor, said upper carriage being vertically adjustable relative to said lower carriage to move said cutter bar up and down through said lower carriage, means for reciprocating both of said carriages, and means for raising and lowering said upper carriage, said means being hydraulically operated.

OTTIE J. BROCK.